INVENTOR
PETER M. MELLIAR-SMITH
BY Smith Michael
Bradford & Gardner
ATTORNEYS

INVENTOR
PETER M. MELLIAR-SMITH
BY
ATTORNEYS

Oct. 20, 1970 P. M. MELLIAR-SMITH 3,535,697

DATA HANDLING ARRANGEMENTS

Filed June 27, 1968 3 Sheets-Sheet 3

INVENTOR
PETER M MELLIAR SMITH
BY
ATTORNEYS

United States Patent Office 3,535,697
Patented Oct. 20, 1970

3,535,697

DATA HANDLING ARRANGEMENTS

Peter M. Melliar-Smith, Lewisham, London, England, assignor to English Electric Computers Limited, London, England, a British company Filed June 27, 1968, Ser. No. 740,729
Claims priority, application Great Britain, June 28, 1967, 29,802/67
Int. Cl. G06f *13/00;* G11c *9/00*
U.S. Cl. 340—172.5 5 Claims

ABSTRACT OF THE DISCLOSURE

A data handling arrangement comprises a register having a plurality of stages for holding instructions. The instructions are removed serially from the last stage and entered serially into the first stage. The instructions enter either from a fast store or a slow store. A sensing unit detects whether the instructions arrive from the fast store or the slow store, and maintains a number of instructions in the register which is greater if the last entered instruction came from the slow store than if the last entered instructions came from the fast store.

The invention relates to data handling arrangements such as, for example, for use in computers.

According to the invention, there is provided a data handling arrangement, comprising first data storage means for storing a plurality of items of data, means for withdrawing said items of data serially from said first storage means, means for feeding items of data serially into said first storage means from a plurality of further storage means, each item of data so fed in originating from a particular one of said further storage means, and control means for controlling the number of items of data in the first storage means in dependence on the origin of each item of data fed therein.

According to the invention, there is further provided fast data storage means having a relatively short access time, slow data storage means having a relatively long access time, output data storage means, means operative, when activated, to search the fast storage means for a requested item of data and to obtain it therefrom when it is found therein and to insert it into the output data storage means and operative in response to absence of the requested item of data from the fast storage means to search the slow storage means for the requested item of data and to obtain it therefrom and to insert it into the output data storage means, output means for withdrawing items of data serially from the output data storage means, and control means operative to compare the number of items of data in the output data storage means with a first predetermined number when the last item of data fed into the output data storage means was fed from the fast data storage means and operative to compare the number of items of data in the output data storage means with a second, greater, predetermined number when the last item of data fed into the output data storage means was fed in from the slow data storage means, the said control means including means operative to allow a further item of data to be fed into the output data storage means only when the number of items of data in the output data storage means is less than the said predetermined number with which it is compared.

Figure 1:
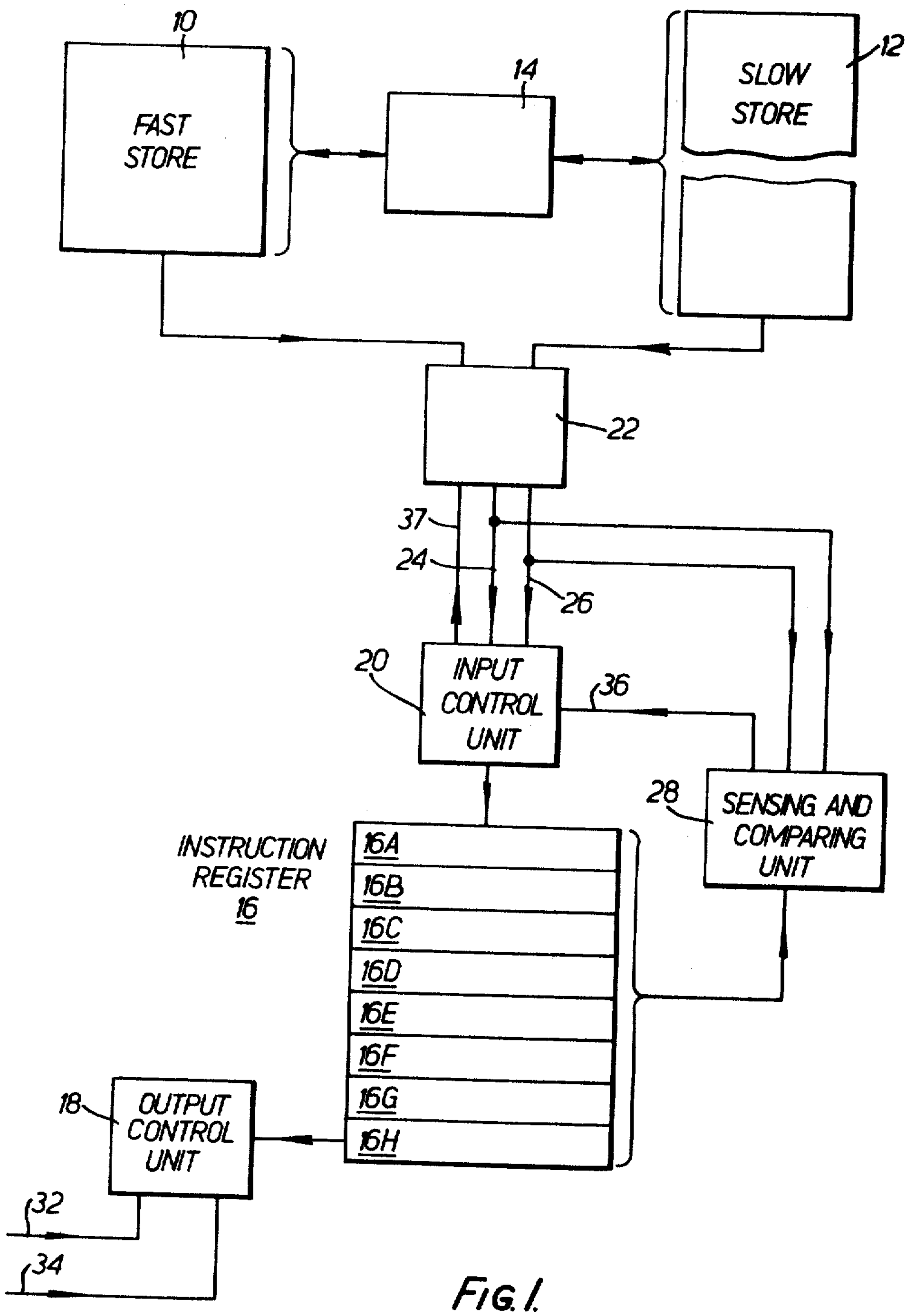
Figure 2A:
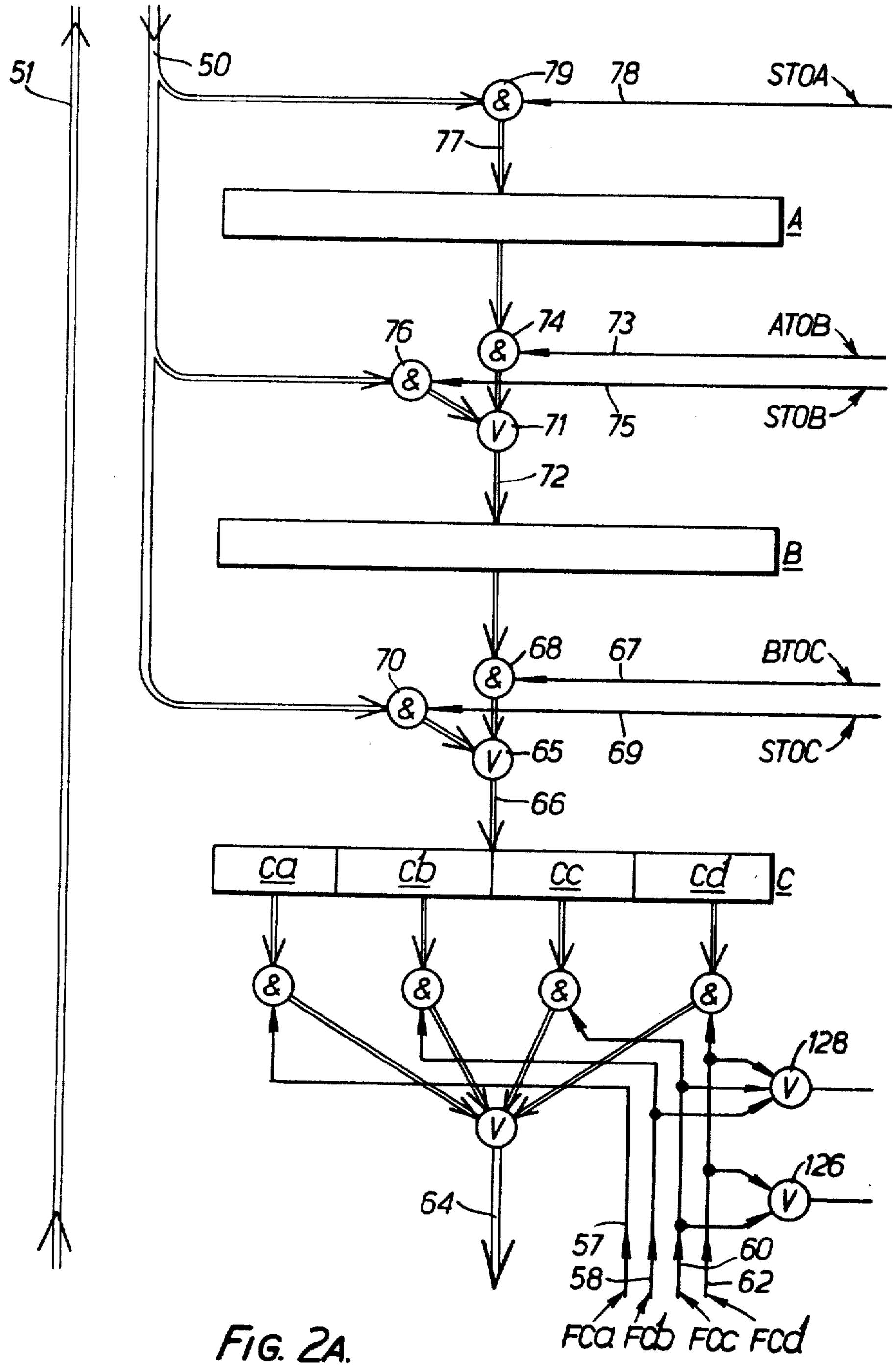
Figure 2B:
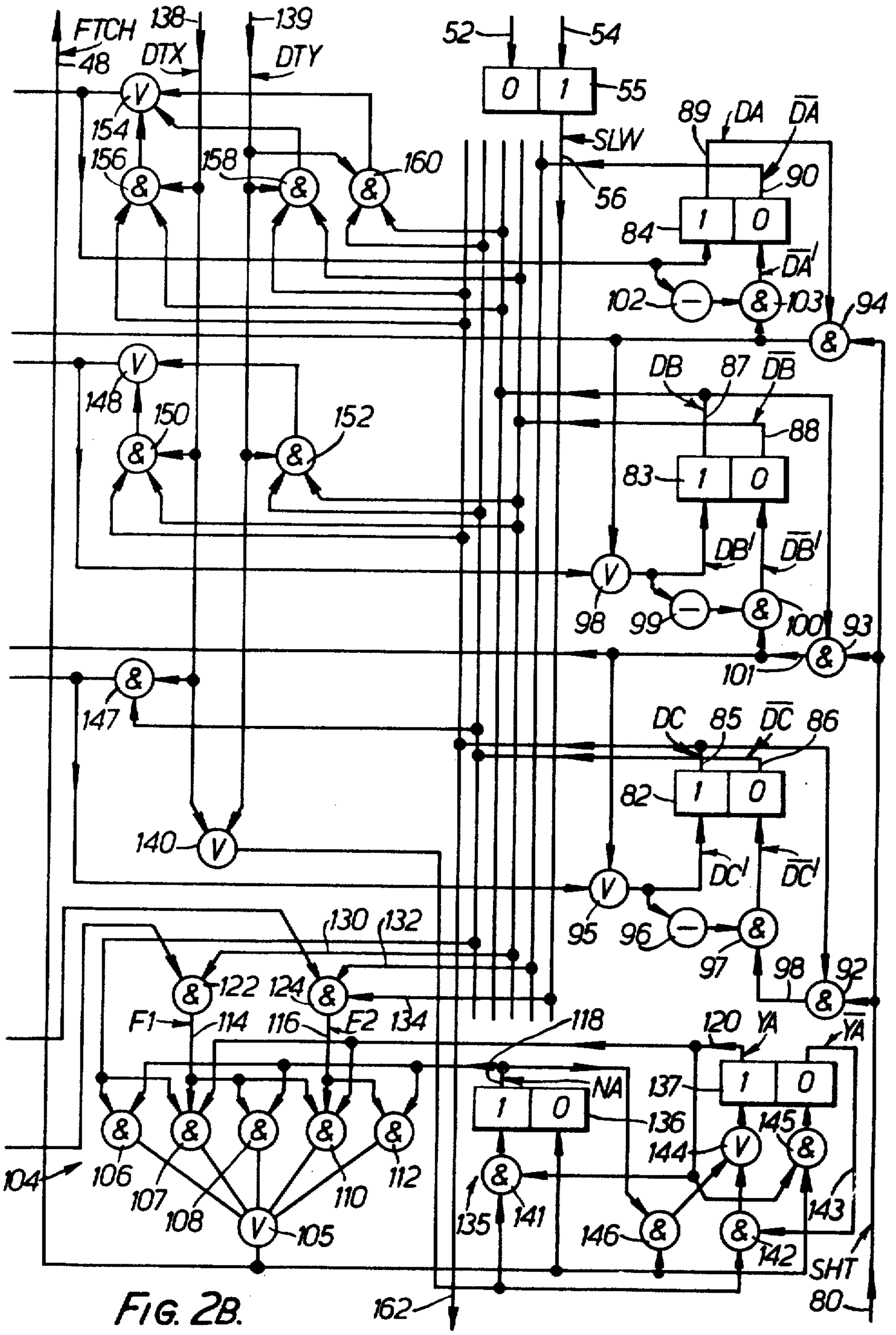

A data handling arrangement embodying the invention will now be described by way of example and with reference to the accompanying drawings, in which:

FIG. 1 is a block diagram of the data handling arrangement illustrating its principle of operation; and FIGS. 2A and 2B are logic diagrams of a modified form of the data handling arrangement.

FIG. 1

The data handling arrangement to be described stores instructions to be performed by the computer and presents them to the computer when required.

The arrangement comprises a fast access store 10 and a slower access store 12, the capacity of the slow store 12 being very much larger than that of the fast store 10. The slow store 12 may be a magnetic core store and the fast store 10 may be a store constructed with integrated circuits. The fast store 10 and the slow store 12 both store instructions required by the computer and are interconnected by control circuitry 14 which operates with the aim of ensuring that the fast store 10 always contains those instructions which are most frequently required; the control circuitry 14 may be of the form described in copending patent application Ser. No. 726,136 filed May 2, 1968.

The arrangement also includes an instruction register 16 into which instructions are fed from the stores 10 and 12 and from which the computer obtains the instructions serially and acts on them. The instruction register 16 thus maintains a "queue" of instructions ready for use serially by the computer immediately as they are required, and delays which might occur should the computer have to obtain each instruction directly from one of the stores 10, 12, are thus avoided.

The instruction register 16 has a plurality of stages 16A to 16H each storing one instruction. The instructions are extracted from the register 16 by an output control unit 18 which is connected to the stage 16H. As each instruction is extracted from the stage 16H, the remaining instructions in the register 16 each shift into the next succeeding stage of the register. Instructions are fed into the register 16 from the stores 10, 12 by means of an input control unit 20 which is connected to the stage 16A.

A unit 22 controls the extraction of instructions from the stores 10 and 12 and feeds them to the control unit 20 for insertion into the register. When activated, the unit 22 first searches the fast store 10 for the required instruction and only searches the slow store 12 if the required instruction is not found in the fast store 10. Since the control circuitry 14 acts to ensure that the fast store contains the most frequently required instructions, it is only relatively infrequently that the output unit 22 will have to obtain a required instruction from the slow store 12 and, in this way, the required instruction is normally very rapidly obtained from the fast store without the delay involved in searching the slow store.

Instructions obtained by the output unit 22 from the fast store 10 are passed to the control unit 20 (for insertion into the stage 16A) by means of a line 24. Instructions obtained by the output unit 22 from the slow store 12 are passed to the control unit 20 (for insertion into the stage 16A) by means of a line 26. The control unit 20 is controlled by a sensing and comparing unit 28 which is responsive to the number of instructions in the register 16 at any given time. The sensing unit 28 is also connected to the lines 24 and 26 and records whether the last instruction received by the control unit 20 and inserted into the register 16 originated from the fast store 10 or from the slow store 12.

The operation of the arrangement will now be described in greater detail.

When the computer requires the next instruction, an appropriate signal is fed to the control unit 18 on a line 32 and the control unit extracts the instruction in the register stage 16H and feeds it to the computer on a line 34. All the instructions in the register 16 then shift to the next stage, and the sensing unit 28 senses that there is one less instruction in the register. The sensing unit 28 compares the number of instructions in the register with one of two predetermined numbers, X and Y, X being less than Y. If the last instruction fed into the register 16 originated from the fast store 10 (that is, it was fed in on the line 24), then the sensing unit 28 compares the number of instructions in the register 16 with the number X. If the number of instructions is less than X, the sensing unit 28 activates the control unit 20 by means of a signal on a line 36. The control unit 20 thereupon instructs the unit 22, by means of a line 37, to obtain the next instruction which will be required when all the instructions at present in the register 16 have been operated on by the computer. The unit 22 searches the fast store 10 for the required instruction and, if it is there, obtains it and feeds it into control unit 20 by means of line 24. The sensing unit 28 senses the resulting increase of one in the number of instructions in the register 16 and recompares this number with the number X. If the number of instructions in the register 16 is now equal to or greater than X, no further instructions are called for. If, however, the number of instructions in the register 16 is still less than X, then the control unit 20 is reactivated by the sensing unit 28 and once again the unit 22 searches for the next instruction and feeds it into the register 16 by means of one or other of the lines 24 and 26 according to whether the instruction was stored in the store 10 or the store 12. If this further instruction is fed in on the line 24 (that is, it was obtained from the fast store 10) then the sensing unit 28 compares the new number of instructions in the register 16 with X to determine whether or not to call for further instructions.

If, however, the instruction obtained by the unit 22 comes from the slow store 12 then the sensing unit 28 compares the new number of instructions in the register 16 with Y which is greater than X. If the number of instructions in the register 16 is less than Y, then the unit 22 is reactivated to retrieve the next instruction and, after retrieval thereof, the sensing unit 28 recompares the number of instructions in the register with the number X or Y depending on whether the last-entered instruction came from the fast store 10 or the slow store 12.

In this way, the number of instructions maintained in the register 16 at any given time is dependent on whether the last-entered instruction originated from the fast store 10 or from the slow store 12, a greater number of instructions being maintained in the register 16 if the last-entered instruction came from the slow store 12 than if the last-entered instruction came from the fast store 10.

The addresses of instructions to be obtained from the stores 10 and 12 may be generated in or fed into the unit 22.

FIGURES 2A AND 2B

Description

FIGS. 2A and 2B show a modified form of the arrangement of FIG. 1 and in greater detail. As in the case of FIG. 1, the arrangement of FIGS. 2A and 2B contains an instruction register in which a queue of instructions is maintained, these instructions being obtained from the fast or slow store in the manner of FIG. 1 and the number of instructions maintained in the instruction register being automatically controlled, again in the manner of FIG. 1, in dependence on whether the last entered instruction originated from the fast store or the slow store.

The fast and slow stores are not shown in FIGS. 2A and 2B. When the arrangement of FIGS. 2A and 2B requires instructions to enter into the instruction register, it generates a signal FTCH on a line 48 whereupon, in the manner explained in connection with FIG. 1, the instructions are fetched from either the fast store or the slow store and enter on a channel 50. A channel 51 carries the addresses of the instructions to be fed into the instruction register. A line 52 is energised if the instructions come from the fast store and a line 54 is energised if the instructions come from the slow store. Lines 52 and 54 control a bistable unit 55 which generates a signal SLW on a line 56 when set into the "1" state by energisation of line 54. The instruction register in FIG. 2 comprises three sections A, B, and C, each section being sub-divided into four stages. The stages *Ca*, *Cb*, *Cc* and *Cd* for section C are shown but the stages for section A and B are not shown. Section C corresponds to the stage 16H of FIG. 1 and is the section from which the instructions are taken by the computer. Sections B and C correspond to other stages of the register 16. The computer extracts the instructions in sequence from the stages *Ca*, *Cb*, *Cc*, and *Cd* by generating signals F*Ca*, F*Cb*, F*Cc*, F*Cd*, on lines 57, 58, 60 and 62 in that order. In effect, then, the contents of respective stages *Ca*, *Cb*, *Cc* and *Cd* are destructively read out in order to allow the contents of register section B to be transferred to section C. Each extracted instruction is passed to the computer on a channel 64. Instructions are transferred from one section A, B, C to the next section in groups of four; that is, instructions are not fed into a section of the register until all the stages thereof are empty. Instructions are transferred into the section C by means of an OR gate 65 and a channel 66. These instructions come from section B when a signal BTOC on line 67 is generated to activate an AND gate 68, and come directly from the channel 50 when a signal STOC on a line 69 is generated to activate an AND gate 70. Instructions are transferred into the section B by means of an OR gate 71 and a channel 72. These instructions come from the section A when a signal ATOB on a line 73 is generated to activate an AND gate 74, and come directly from the channel 50 when a signal STOB on a line 75 is generated to activate an AND gate 76. Instructions are transferred into the section A on a channel 77 and come directly from the channel 50 when a signal STOA on a line 78 is generated to activate an AND gate 79. Transfer of instructions from one section to the next is controlled by the computer which generates a signal SHT on a line 80 when the section C is empty of instructions.

Each section A, B, C of the register has a respective one of three bistable units 84, 83, 82 associated with it. Each of these bistable units is arranged, in a manner to be described, to be set into a "1" state when the associated register stage is not empty of instructions and into the "0" state when the associated register stage is empty of instructions. The bistable unit 82 produces a signal DC on a line 85 when in the "1" state and a signal $\overline{DC}$ on a line 86 when in the "0" state; similarly, the bistable unit 83 produces a signal DB on a line 87 when in the "1" state and a signal $\overline{DB}$ on a line 88 when in the "0" state, and the bistable unit 84 produces a signal DA on a line 89 when in the "1" state and a signal $\overline{DA}$ on a line 90 when in the "0" state. The lines 85, 87 and 89 are respectively connected to AND gates 92, 93 and 94 which also receive the signals SHT on line 80. When operated, AND gates 93 and 94 respectively produce the signals BTOC and ATOB on lines 67 and 73.

The bistable unit 82 is controlled by an OR gate 95, energised by lines 67 and 69, which produces an output signal DC′ to switch the unit 82 into the "1" state. The signal DC′ is also fed through an inverter 96 to an AND gate 97 which also receives an input on a line 98 from AND gate 92. When operative, AND gate 97 produces a signal $\overline{DC}'$ which sets the unit 82 into the "0" state.

When bistable unit 83 is controlled by an OR gate 98, energised by lines 73 and 75, which produces a signal DB′ to switch the unit 83 into the "1" state. The signal DB′ is also fed through an inverter 99 to an AND gate 100 which receives a further input from AND gate 93 on a line 101. When operative, AND gate 100 produces a signal $\overline{DB}'$ which sets the unit 82 into the "0" state.

The bistable unit 84 is controlled directly from line 78 so that the signal STOA sets the unit 84 into the "1" state. The line 78 is also connected to an inverter 102 which supplies an AND gate 103 connected to line 73 from AND gate 94. When operative, AND gate 103 produces a signal $\overline{DA}'$ to set the unit 84 into the "0" state.

The signals FTCH on line 48 are generated by logic circuitry 104. The latter comprises an OR gate 105 which is connected to the line 48 and which receives inputs from AND gates 106, 107, 108, 110 and 112. These AND gates are controlled by signals F1 and F2 produced on lines 114 and 116, and by signals NA and YA produced on lines 118 and 120. Lines 114 and 116 are supplied from the outputs of AND gates 122 and 124 respectively. Each of these latter AND gates receives an input from a respective one of two OR gates 126 and 128, OR gate 126 being connected to receive signals FC*c* and FC*d* and OR gate 128 being connected to receive signals FC*b*, FC*c* and FC*d*. In addition, AND gate 122 receives signals $\overline{DB}$ on a line 130 which is connected to line 88, and AND gate 124 receives signals $\overline{DA}$ and SLW on lines 132 and 134 which are respectively connected to lines 90 and 56.

The signals NA and YA on lines 114 and 116 are produced by logic circuitry 135. It will be appreciated that it is possible for the data handling arrangement to be responding to more than one FTCH signal at the same time. The logic circuitry 135 records the number of FTCH signals to which the arrangement is responding at any given time. The circuitry 135 includes two bistable units 136 and 137. When the bistable unit 136 is in the "1" state, it generates the signal NA and this indicates that the arrangement is not responding to any FTCH signal. When the bistable unit 137 is in the "1" state, it generates the signal YA indicating that the arrangement is responding to one (and only one) FTCH signal. If neither a NA nor a YA signal is present, then the arrangement is responding to more than one FTCH signal.

The logic circuitry 135 is controlled by signals DTX and DTY which arrive on lines 138 and 139. The signal DTX indicates that the instructions on the channel 50 are arriving thereon in the same order as the order of generation of the corresponding FTCH signals on the line 48. The signal DTY indicates that the instructions are not arriving in this order. In addition, generation of either a signal DTX or a signal DTY indicates that the fetching of the required instruction has been completed.

The lines 138 and 139 are connected through an OR gate 140 to AND gates 141 and 142. AND gate 142 receives a further input, a signal $\overline{YA}$, on a line 143 when the unit 137 is in the "0" state and when operative, sets the unit 137 into the "1" state through an OR gate 144. AND gate 141 receives a further input from line 120 and, when operative, sets the unit 136 into the "1" state. Unit 136 is set into the "0" state by the FTCH signals from OR gate 105. Unit 137 is set into the "0" state through an AND gate 145 which is connected to the output of OR gate 105 and to the line 120. A further AND gate 146 is connected through OR gate 144 to set the unit 137 into the "1" state.

The signals DTX and DTY on lines 138 and 139 are also used to produce the signals STOC, STOB and STOA. Thus, signal STOC is produced from an AND gate 147 one of whose inputs is connected to line 138 and the other of which is connected to receive signal $\overline{DC}$. The signal STOB is produced from an OR gate 148 which receives inputs from two AND gates 150 and 152. AND gate 150 receives signals DTX, DC and $\overline{DB}$, while AND gate 152 receives signals DTY, $\overline{DC}$ and $\overline{DB}$. The signal STOA is produced from an OR gate 154 which receives inputs from three AND gates 156, 158 and 160. AND gate 156 receives signals DTX, DC and DB. AND gate 158 receives signals DTY, DC, and $\overline{DB}$. AND gate 160 receives signals DTY, $\overline{DC}$ and DB.

Operation

The operation is explained in the table below which indicates the conditions under which the various signals shown on FIG. 2 are generated.

In operation, the computer extracts the instructions in sequence on the channel 64 by generating the signals FC*a*, FC*b*, FC*c*, FC*d* in that order. In similar fashion to that explained in connection with FIG. 1, the FTCH signals are generated (by the logic circuitry 104) in dependence on the number of instructions in the register sections A, B and C and in dependence on the origin of the last-entered instruction. If the last-entered instruction originated from the fast store, the logic circuitry 104 is arranged to respond when there are two or less instructions in the instruction register; this condition obtains when either of the signals FC*c* or FC*d* is generated (indicating that stages C*a* and C*b* of stage C of the register have been emptied of instructions) and when, simultaneously, section B is empty (that is, bistable unit 83 is generating signal $\overline{DB}$ on line 88) and, under this condition, the logic circuitry 104 generates a signal F1. If the last-entered instructions originated from the slow store (that is, the bistable unit 55 is generating a SLW signal on line 56) then the logic circuitry 104 is arranged to respond when there are seven or less instructions in the instruction register; this condition is obtained when any one of the signals FC*b*, FC*c*, and FC*d*, is present (indicating that section C contains less than four instructions) and when, simultaneously, the section A is empty (that is, bistable unit 84 is generating a $\overline{DA}$ signal on line 90) and, under this condition, the logic circuitry 104 generates a signal F2. Thus, in this manner, the maximum number of items of data which are to be held in register sections is set at seven if the last item of data originates from slow store 12, or is set at two if the last item originates from the fast store 10. The FTCH signals are generated in response to the signals F1 and F2 under control of logic circuitry 135. However, generation of a FTCH signal does not result automatically from production of a signal F1 or F2. As shown in the table, if one instruction fetch is in progress (so that the bistable unit 137 is generating a YA signal on line 120), then both signals F1 and F2 must be present simultaneously to produce a FTCH signal. If no instruction fetch is in progress (so that the bistable unit 136 is producing a NA signal on line 118), then production of either the signal F1 or the signal F2 will result in generation of a FTCH signal. If neither a NA nor a YA signal is being produced (indicating that more than one instruction fetch is in progress) then no FTCH signal can be generated.

In similar fashion to the data handling arrangement of FIG. 1, the data handling arrangement of FIG. 2 responds to each FTCH signal on the line 48 by reading the required instructions out of the fast store if present therein, or reading them out of the slow store if not present in the fast store, and presenting them to the instruction register on the channel 50. At the same time, one or other of the signals DTX and DTY is generated as shown in the table.

The incoming instructions on the channel 50 are fed into the register sections under the control of the signals STOA, STOB, STOC. As is shown in the table below, these signals are generated under the control of the signals DTX and DTY. The table shows that, when the instructions are arriving on channel 50 in the correct order (that is, signal DTX is present), instructions are fed from the channel 50 into section A if sections B and C are holding instructions, or are fed into section B if section C is holding instructions and section B is empty, or are fed into section C if section C is empty.

If, on the other hand, the instructions on the channel 50 are not arriving in the correct order (that is, signal DTY is present) then the instructions are fed into section A if only one of sections B and C are holding instructions, or are fed into section B if both sections B and C are empty.

When the computer has used all the instructions in the section C it generates a signal SHT on line 80 which generates signals ATOB and BTOC so that the section A passes its instructions to section B and section B passes its instructions to section C.

The signal DC on line 85 can be fed to the computer on a line 162 to indicate that section C is not empty of instructions and that the computer can proceed to extract instructions.

TABLE

| Signal: | Generated by |
|---|---|
| ATOB | DA.SHT |
| BTOC | DB.SHT |
| STOA | $DC.DB.DTX+DC.\overline{DB}.DTY$ |
| STOB | $DC.\overline{DB}.DTX+\overline{DC}.\overline{DB}.DTY+\overline{DC}.DB.DTY$ |
| STOC | $\overline{DC}.DTX$ |
| $\overline{DA}'$ | $DA.\overline{STOA}.ATOB.SHT$ |
| DB' | ATOB+STOB |
| $\overline{DB}'$ | $DB.(\overline{ATOB.STOB}).BTOC.SHT$ |
| DC' | BTOC+STOC |
| $\overline{DC}'$ | $DC.(\overline{BTOC.STOC}).SHT$ |
| NA | YA.(DTX+DTY) |
| $\overline{NA}$ | FTCH |
| YA | $NA.FTCH+\overline{YA}.(DTX+DTY)$ |
| $\overline{YA}$ | YA.FTCH |
| F1 | $\overline{DB}.FCc+FCd$ |
| F2 | $\overline{DA}.(FCb+FCc+FCd).SLW$ |
| FTCH | $\overline{DC}.NA+\overline{DB}.(FCc+FCd).NA+\overline{DA}.(FCb+FCc+FCd).SLW.NA+\overline{DC}.\overline{DB}.(FCc+FCd).YA+\overline{DB}.(FCc+FCd).\overline{DA}.FCb+FCc+FCd.SLW.YA$ |

The arrangement of FIG. 2 differs from that of FIG. 1 in that, in the arrangement of FIG. 1, instructions are only fed in to stage 16A of the instruction register from the stores while in the arragement of FIG. 2 instructions can be fed into any section of the register from the stores.

FIGURES 1 AND 2

It is found in practice that, if an instruction required has to be obtained from the slow store (because it is not in the fast store), then there is a strong likelihood that the next required instruction will also be in the slow store and not in the fast store. The data handling arrangements described take this into account and reduce the possibility of the instruction register becoming empty during operation of the computer. At the same time, however, the arrangements ensure that the instruction register is no fuller than necessary: it will be appreciated that (due, for example, to a jump in the program) the computer may not require every instruction in the register and, by ensuring that the register is no fuller than necessary, delays due to the presence of unwanted instructions, which may necessitate the emptying of the register, are reduced.

What is claimed is:

1. A data handling arrangement, comprising first data storage means for storing a plurality of items of data, output means connected to the first data storage means and operative to withdraw said items of data serially therefrom, second and third storage means, input means connected to said second and third storage means and to said first data storage means and operative to feed items of data into said first storage means from respective ones of the second and third storage means, first sensing means connected to sense the number of items of data in the first storage means; second sensing means to sense whether items of data fed by said input means are fed from said second or third storage means, control means responsive to said first and second sensing means and operative to control the number of items of data in the first storage means in dependence upon whether the last item of data fed thereinto is fed from said second or said third data storage means.

2. An arrangement according to claim 1 in which said second data storage means has a relatively short access time and said third data storage means has a relatively long access time.

3. An arrangement according to claim 2, in which the said control means comprises means operative to establish first and second predetermined numbers the first number being less than the second number, first comparing means operative to compare the number of items of data in the first data storage means with the first number when the last item of data fed into the first data storage means originated from the second data storage means and to produce a first control signal when the number of items of data in the first data storage means is less than the first number, second comparing means operative to compare the number of items of data in the first data storage means with the second number when the last item of data fed into the first data storage means originated from the third data storage means and to produce a second control signal when the number of items of data in the first data storage means is less than the second number, and means connected to the first and second comparing means to receive the first and second control signals and connected to the said input means whereby to allow a further item of data to be fed into the first data storage means only after occurrence of a said control signal.

4. A data handling arrangement comprising a fast data store having a relatively short access time, a slow data store having a relatively long access time, output data storage means, first searching means connected to said fast store and operative, when activated, to search the fast store for a requested item of data and to obtain it therefrom, second searching means connected to said slow store and operative, when activated, to search the slow store for a requested item of data and to obtain it therefrom, control means connected to said searching means and to said output data storage means and operative to activate the first searching means to obtain a requested item of data and operative, if the requested item of data is not found by the first searching means, to activate the second searching means to obtain the requested item of data, input means connected to the control means and the output data storage means and operative to insert the obtained items of data serially into the output data storage means, means establishing the first and second comparison numbers the second of which is greater than the first, means connected to sense the origin of each obtained item of data fed into the output data storage means, first comparing means connected to be controlled by the sensing means and operative to compare the number of items of data in the output data storage means with the said first comparison number when the last-entered item of data in the output data storage means originated from the fast store, the first comparing means being arranged to produce a first control signal when the number of items of data in the output data storage means is less than the first comparison number, second comparing means connected to be controlled by the sensing means and operative to compare the number of items of data in the output data storage means with the said second comparison number when the last-entered item of data in the output data storage means originated from the slow store, the second comparing means being operative to produce a second control signal when the number of items of data in the output data storage means is less than the second comparison number, means connecting said input means to be controlled by said first and second control signals whereby to allow each said item of data to enter the output data storage means only when one of the said control signals occurs, a central processing unit, and output means responsive to said central processing unit for withdrawing items of data serially from the output data storage means.

5. An arrangement according to claim 4, in which the output data storage means comprises a register having a plurality of stages one for storing each item of data.

References Cited

UNITED STATES PATENTS

| | | | |
|---|---|---|---|
| 3,292,153 | 12/1966 | Barton | 340—172.5 |
| 3,275,991 | 9/1966 | Schneberger | 340—172.5 |
| 3,156,897 | 11/1964 | Bahnsen et al. | 340—172.5 |

GARETH D. SHAW, Primary Examiner